United States Patent [19]

Standke et al.

[11] Patent Number: 5,808,125
[45] Date of Patent: Sep. 15, 1998

[54] FLUOROALKYL-FUNCTIONAL ORGANOPOLYSILOXANE-CONTAINING COMPOSITIONS BASED ON WATER, A PROCESS FOR THEIR PREPARATION AND THEIR USE

[75] Inventors: Burkhard Standke, Loerrach; Roland Edelmann, Wehr; Albert-Johannes Frings; Michael Horn, both of Rheinfelden; Peter Jenkner, Rheinfelden; Ralf Laven, Niederdossenbach; Helmut Mack; Jaroslaw Monkiewicz, both of Rheinfelden, all of Germany

[73] Assignee: Huels Aktiengesellschaft, Marl, Germany

[21] Appl. No.: 984,094

[22] Filed: Dec. 3, 1997

[30] Foreign Application Priority Data

Dec. 3, 1996 [DE] Germany ............... 196 49 953.4

[51] Int. Cl.$^6$ ........................................ C07F 7/08
[52] U.S. Cl. ................................. 556/424; 556/425
[58] Field of Search ......................... 556/424, 425

[56] References Cited

U.S. PATENT DOCUMENTS 5,424,130  6/1995  Nakanishi .

*Primary Examiner*—Alan Siegel
*Attorney, Agent, or Firm*—Oblon, Spivak, McClelland, Maier & Neustadt, P.C.

[57] ABSTRACT

An aqueous organopolysiloxane-containing composition comprising organopolysiloxanes of formula I:

$$HO[Si(A)(CH_3)_z(OH)_{1-z}O]_a[Si(B)(R^2)_y(OH)_{1-y}O]_b[Si(C)(CH_3)O]_c[Si(D)(OH)O]_dH \cdot (HX)_e \quad (I),$$

wherein A is an aminoalkyl group of formula II:

$$H_2N(CH_2)_f(NH)_g(CH_2)_hSi(OR)_{3-z}(CH_3)_z \quad (II),$$

in which $0 \leq f \leq 6$, $g=0$ if $f=0$ and $g=1$ if $f>0$, $0 \leq h \leq 6$ and $0 \leq z \leq 1$;

B is a fluoroalkyl group of formula III:

$$R^1-Y-(CH_2)_2Si(R^2)y(OR)_{3-y} \quad (III),$$

wherein $R^1$ is a mono-, oligo- or perfluorinated alkyl group having 1–9 C atoms, or a mono-, oligo- or perfluorinated aryl group, Y is a $CH_2$, O or S group, $R^2$ is a linear, branched or cyclic alkyl group having 1–8 C atoms or an aryl group and $0 \leq y \leq 1$;

C is an alkyl group of formula IV:

$$R^3-Si(CH_3)(OR)_2 \quad (IV),$$

and D is an alkyl group of formula V:

$$R^3-Si(OR)_3 \quad (V),$$

wherein $R^3$, in each case is identical or different, and is a linear, branched or cyclic alkyl group having 1–8 C atoms, and R, in each case is identical or different, and is a linear, branched or cyclic alkyl group having 1–8 C atoms or an aryl group; and HX is an acid, in which X is an inorganic or organic acid radical, and $0 \leq y \leq 1$, $0 \leq z \leq 1$, $a > 0$, $b > 0$, $c \geq 0$, $d \geq 0$, $e \geq 0$ and $(a+b+c+d) \geq 2$, the composition being essentially free from organic solvents, having a flash point of more than 70° C. and liberating essentially no alcohols by hydrolysis on dilution with water.

8 Claims, No Drawings

FLUOROALKYL-FUNCTIONAL ORGANOPOLYSILOXANE-CONTAINING COMPOSITIONS BASED ON WATER, A PROCESS FOR THEIR PREPARATION AND THEIR USE

BACKGROUND OF THE INVENTION

FIELD OF THE INVENTION

The present invention relates to organopolysiloxane-containing compositions based on water, which are essentially free from organic solvents, have a flash point of more than 70° C. and liberate essentially no alcohols by hydrolysis on dilution with water, to a process for their preparation and to their use.

DESCRIPTION OF THE BACKGROUND

Organosilanes of the formula $R^0$—$Si(OR^1)_3$, where $R^0$ is an organic radical and $R^1$ is a methyl or ethyl radical, have diverse uses, for example as adhesion promoters, release agents, rheology improvers, crosslinking agents and hydrophobizing agents.

For ecological, industrial safety and economic reasons, there is an ever increasing trend to use the organosilanes in aqueous form. The following problems generally arise here.

(i) Alcohols are liberated by hydrolysis:

Free alcohols lower the flash point of the solution used, so that explosion-protected machines and special apparatuses must be employed for the necessary processing steps. For toxicological reasons, employees entrusted with handling the substances must be additionally trained and protected. Furthermore, disposal of the spent solution used may present difficulties because of the hydrolysis alcohols. Special wastewater clarification units and also units for aftertreatment of waste gas and waste air are required.

(ii) The organosilane to be applied in water is not water-soluble:

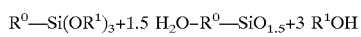

The hydrolysate $R^0$—$SiO_{1.5}$ formed by this reaction precipitates out of the reaction mixture as polymeric silicone resin, so that it is no longer available for the desired use. Although organosilanes having a very highly hydrophobic character, such as, for example, alkylalkoxysilanes, especially those having a long, branched carbon skeleton or optionally having fluorinated alkyl groups, such as are described, for example, in German Patent Application No. 196 44 561.2, hydrolyze or condense very slowly, they are not soluble in water and, after hydrolysis, are chiefly present as polymeric silicone resin which is not water-soluble.

In recent years, a large number of new fields of use have been found for fluoroalkylchlorosilanes and fluoroalkylalkoxysilanes. These compounds are thus employed, for example, as additives in surfactants, as lubricating agents, for the surface-coating of lenses or optical fibers, as primers for fluorinated resins, as constituents of cosmetic formulations, as a modifier in fluorinated rubbers and silicone rubbers and for the production of oil-, dirt and water-repellent surfaces. Such organosilanes as a rule cannot be used or can be used only with disadvantages in aqueous applications, although there is an increasing demand for just such applications. Thus, for example, in the textile and leather industry, surface treatments from aqueous solution are desired objectives. A clear trend toward the use of water-based systems is desired for the impregnation of mineral surfaces, for example, the building facades of plaster, concrete, lime sandstone, brick or other mineral building materials, in the buildings protection sector. Oil- and water-repellent coatings on surfaces, usually glass surfaces, are essentially produced with the aid of fluoroalkylalkoxysilanes and fluoroalkylchlorosilanes (European Laid-Open Application No. 0 629 673 and European Laid-Open Application No. 0 658 525). Such coatings can also be used for the provision of plate glass with a dirt-repellent treatment. The processes described are based on sol-gel processes, in which very fine inorganic particles being produced and employed together with the fluoroalkylsilane employed. The application is technically demanding, and usually uses complex organic solvent mixtures and additives.

Alcoholic solutions based on fluoroalkylalkoxysilanes for producing oil- and water-repellent coatings are known as described in U.S. Pat. No. 5,424,130, such solutions having high alcohol contents of, for example, 52% by weight of ethanol.

In the processes described, the complicated application processes on the one hand and the use of organic solvents on the other hand have adverse effects. In some processes, even substances which are very problematic ecologically, such as chlorinated hydrocarbons or fluorohydrocarbons, are employed as solvents in a considerable concentration (European Laid-Open Application No. 0 491 251 and European Laid-Open Application No. 0 493 747). Furthermore, silanes containing fluoroalkyl groups are very expensive substances. There is, therefore, certainly an economic interest in achieving savings on silanes which contain fluoroalkyl groups, for example, by replacing silanes which contain fluoroalkyl groups by alkylsilanes, virtually as a dilution medium, which could have the result of increasing the hydrophobizing action for the same amount of fluoroalkylsilane employed.

In order to mitigate the known disadvantages described above, the most diverse processes have been suggested in the past.

In the emulsion method, the organosilane, which is not compatible with water per se and is a liquid silicone resin which is not water-soluble, is emulsified in water with the aid of emulsifiers (European Laid-Open Application No. 0 442 098, European Laid-Open Application No. 0 358 652 and U.S. Pat. No. 4,620,878). A disadvantage with this method is that the products comprise noticeable proportions of surfactants as emulsifiers and can liberate considerable amounts of alcohol.

Removal of hydrolysis alcohols by distillation during synthesis of organosilane formulations from water-soluble organosilanes, such as, for example, from 3-aminopropyltriethoxysilane, is known. Aqueous aminosilane systems which have a low alcohol content and are otherwise solvent-free are accessible in this manner and are available on the market, for example in the form DYNASYLAN® 1151.

Although some organosilanes such as, for example, aminoalkylalkoxysilanes. are stable in aqueous solution they can be used to only a limited extent for the diverse possible uses of organofunctional silanes. The addition of further organic functionalities per se in an aqueous solution of non-stable organosilanes, in particular in a relatively high concentration, can result in a formulation with particular properties or with a combination of hitherto unknown properties.

A formulation of silane combinations in water is known as disclosed U.S. Pat. No. 5,073,195. The silane formulations are prepared from an alkyltrialkoxysilane which is not water-soluble and a water-soluble silane, such as, for example, an aminoalkylalkoxysilane, in a molar ratio of 1:2–3:1. As can be seen from the examples of the U.S. patent, the formulations are prepared by hydrolysis of the silane mixture in less than the stoichiometric ratio and removing volatile materials of the reaction mixture at 60° C. under reduced pressure, and for subsequent uses the silane formulations thus obtained are also diluted with water. As a result of dilution with water, however, the alkoxy groups which remain, as a result of incomplete hydrolysis, are then split off in the form of the corresponding alcohols. The silane cohydrolysates disclosed thus comprise free alcohols in significant amounts, and can moreover liberate further amounts of alcohol by hydrolysis, and contain no Si compounds which carry fluoroalkyl groups, which means that the application properties of the products are adversely affected in comparison to the products of the invention.

European Patent Application No. 0 675 128 describes the modification of water-based organosilane formulations with small amounts of organosilanes which are not water-soluble per se, such as, for example, methyltrimethoxysilane or vinyltrimethoxysilane. In fact, a molar ratio of the component, which is not water-soluble, to the water-soluble component of 1:2.5 is possible. With a higher proportion of silanes which are not water-soluble, highly viscous products which gel in the course of time are formed. The application properties of the formulations prepared essentially correspond to those of the above-mentioned aqueous organosilane formulations. Aqueous solutions which have relatively high contents of organosilanes, which are not water-soluble, for example methacryloxypropyltrimethoxysilane, and are stable for months are not accessible by this process. The preparation of purely aqueous solutions using silanes which have a highly hydrophobic action, such as, for example, isobutyl- or octyltrimethoxysilane, is also certainly not possible in this manner.

European Laid-Open Application No. 0 716 127 and European Laid-Open Application No. 0 716 128 disclose the preparation of water-soluble, solvent-free organosilane formulations which are essentially free of hydrolysis alcohols and have high contents of silanes which are not water-soluble, inter alia, alkylsilanes, vinylsilanes and ureidosilanes. The water-solubility of the formulations is achieved by controlled cohydrolysis of aminosilanes with silanes which are not water-soluble, subsequent neutralization of the amino functional group with acids, and distillation of the hydrolysis alcohols. A need continues to exist for a solvent free, aqueous organosilane containing composition which is useful in a variety of coating and substrate treatment applications.

SUMMARY OF THE INVENTION

Accordingly, one object of the present invention is to provide essentially solvent-free, aqueous organosilane-containing formulations which contain fluoroalkyl groups, among other functional groups and which do not liberate alcohols by hydrolysis upon dilution of the composition with water.

Briefly, this object and other objects of the present invention as hereinafter will become more readily apparent can be attained by an aqueous organopolysiloxane-containing composition which is essentially free from organic solvents, has a flash point of more than 70° C. and liberates essentially no alcohols by hydrolysis on dilution with water, wherein the composition comprises organopolysiloxanes of formula I:

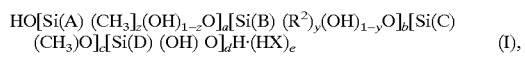

$$HO[Si(A)\ (CH_3)_z(OH)_{1-z}O]_a[Si(B)\ (R^2)_y(OH)_{1-y}O]_b[Si(C)(CH_3)O]_c[Si(D)\ (OH)\ O]_dH\cdot(HX)_e \quad (I),$$

wherein A is an aminoalkyl group of formula II:

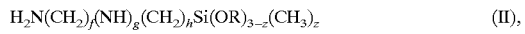

$$H_2N(CH_2)_f(NH)_g(CH_2)_hSi(OR)_{3-z}(CH_3)_z \quad (II),$$

in which $0 \leq f \leq 6$, $g=0$ if $f=0$ and $g=1$ if $f>0$, $0 \leq h \leq 6$ and $0 \leq z \leq 1$;

B is a fluoroalkyl group of formula III:

$$R^1-Y-(CH_2)_2Si(R^2)_y(OR)_{3-y} \quad (III),$$

wherein $R^1$ is a mono-, oligo- or perfluorinated alkyl group having 1–9 C atoms, i.e. linear, branched and cyclic alkyl groups, or a mono-, oligo- or perfluorinated aryl group, Y is a $CH_2$, O or S group, $R^2$ is a linear, branched or cyclic alkyl group having 1–8 C atoms or an aryl group and $0 \leq y \leq 1$; and, where appropriate, C is an alkyl group of formula IV:

$$R^3-Si(CH_3)\ (OR)_2 \quad (IV),$$

and D is an alkyl group of formula V:

$$R_3-Si(OR)_3 \quad (V),$$

wherein $R^3$ is a linear, branched or cyclic alkyl group having 1–8 C atoms, $R^3$ is in each case identical or different, R, in each case being identical or different, is a linear, branched or cyclic alkyl group having 1–8 C atoms or an aryl group; and HX is an acid, in which X is an inorganic or organic acid radical such as, for example, chloride, nitrate, formate or acetate, and $0 \leq y \leq 1$, $0 \leq z \leq 1$, $a>0$, $b>0$, $c \geq 0$, $d \geq 0$, $e \geq 0$ and $(a+b+c+d) \geq 2$, preferably $(a+b+c+d) \geq 4$. R is preferably a methyl, ethyl, propyl or isopropyl group.

DETAILED DESCRIPTION OF THE PREFERRED EMBODIMENTS

It has been found, surprisingly, that essentially solvent-free, aqueous organopolysiloxane-containing compositions which have a flash point of more than 70° C. and liberate essentially no alcohols by hydrolysis on dilution with water, and which furthermore contain Si-bonded fluoroalkyl functions, are accessible in a simple and economical manner as homogeneous, clear solutions which are stable for several weeks if a mols of water-soluble aminosilanes of formula II and b mols of fluoroalkyl-functional organosilanes of formula III and, if appropriate, c and d mols of organosilanes of formulae IV and V, which are not water-soluble, are mixed in a molar ratio of $M=[a/(b+c+d)] \geq 0.1$ where $a>0$, $b>0$, $c \geq 0$, $d \geq 0$, the organosilane mixture is mixed with water or a water/acid mixture and/or a water/acid/alcohol mixture, the amount of acid suitably being selected such that the reaction mixture has a pH in the range from 1–8, and the alcohol already present and/or formed during the reaction is removed. The organosilane polycondensates formed generally have the approximate structure of formula I (see above). Complete clarification of the structure with the usual methods of polymer analysis is not possible because of the very high reactivity of the organofunctional siloxanes, and a small proportion of non-hydrolyzed, Si-bonded alkoxy groups in compounds formula I, therefore, also cannot be excluded. The content of organopolysiloxanes which contain fluoroalkyl groups as the active compound in the composition of the invention is suitably 0.005–60% by weight, in particular, 0.01–10% by weight.

Aqueous compositions disclosed herein are to be understood as meaning those which comprise no aliphatic or aromatic hydrocarbons, halogenated hydrocarbons, glycols, glycol ethers, ethers, ketones, esters, amides or other nitrogen compounds, or sulfur or nitro compounds on a purely organic basis, or proton-free (or hydrogen-free) solvents in proportions of more than 100 ppm by weight. In contrast, proton-containing compounds such as water, inorganic and organic acids and alcohols such as methanol, ethanol, and isopropanol, as well as higher alcohols in this series, are not regarded as organic solvents.

The organopolysiloxane-containing composition of the invention suitably comprises a monobasic inorganic and/or organic acid and/or secondary products thereof, the composition preferably having a pH ranging from 1–8, particularly preferably a pH of 1–6, and especially preferably a pH of 1–5. The term secondary products at this point is to be understood as meaning compounds such as alkali metal halides, in particular sodium chloride or potassium chloride, alkali metal acetates, alkali metal formates, alkali metal nitrates or compounds of the amino groupings in the organopolysiloxanes with inorganic or organic acid radicals, i.e.,ammonium ion, such as shown in formula I.

The present invention moreover relates to an organopolysiloxane-containing composition which is prepared by:

(i) mixing water-soluble organosilanes of formula II:

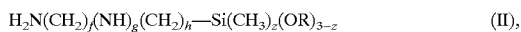

in which $0 \leq f \leq 6$, $g=0$ if $f=0$ and $g=1$ if $f>1$, $0 \leq h \leq 6$, $0 \leq z \leq 1$ and R is a linear, branched or cyclic alkyl group having 1–8 c atoms or an aryl group, with fluoroalkyl-functional organosilanes of formula III:

wherein $R^1$ is a mono-, oligo- or perfluorinated alkyl group having 1–9 C atoms or a mono-, oligo- or perfluorinated aryl group, Y is a $CH_2$, O or S group, $R^2$ is a linear, branched or cyclic alkyl group having 1–8 C atoms or an aryl group and R is a linear, branched or cyclic alkyl group having 1–8 C atoms or an aryl group and $0 \leq y \leq 1$, and organosilanes of formula IV:

and/or organosilanes of formula V:

wherein $R^3$, in each case is identical or different, and is a linear, branched or cyclic alkyl group having 1–8 C atoms, and R, in each case is identical or different, and is a linear, branched or cyclic alkyl group having 1–8 C atoms or an aryl group, in a molar ratio of $M=[a/(b+c+d)] \geq 0.1$ where $a>0$, $b>0$, $c \geq 0$, $d \geq 0$, wherein a, b, c and d are the sums of the numbers of mols of the organosilanes of formulas II, III, IV and V, respectively;

(ii) adding water or a water/acid mixture and/or a water/acid/alcohol mixture to the mixture;

(iii) adjusting the pH of the reaction mixture to a value ranging from 1–8; and (iv) removing the alcohol already present and/or formed during the reaction.

Another aspect of the present invention is a process for the preparation of an organopolysiloxane-containing composition, by:

(i) mixing a, b, c and d mols of water-soluble organosilanes of formulas II, III, IV and V, respectively, in a molar ratio of $0.1 \leq [a/(b+c+d)]$ where $a>0$, $b>0$, $c \geq 0$, $d \geq 0$;

(ii) mixing the organosilane mixture with water or a water/acid mixture and/or a water/acid/alcohol mixture, the amount of acid being selected such that the reaction mixture has a pH in the range from 1–8; and (iii) removing the alcohol already present and/or formed during the reaction.

The process of the invention is generally carried out as follows.

The alkoxysilanes of formulae II and III can first be mixed, and if appropriate alkoxysilanes of formula IV and/or V can also be admixed. As a rule, the mixture can then be subjected to co-condensation with water. Thereafter, acid or an alcohol/acid mixture can be added thereto, the amount of acid suitably being selected such that the reaction mixture has a pH of 1–8 and the amount of alcohol being selected such that the viscosity of the resulting reaction mixture does not exceed a value of 50,000 mPa·s. If appropriate, alcohol already present or the alcohol forming or formed during the reaction can be removed by distillation, it being possible for water to replace the amount of alcohol separated so that the above-mentioned viscosity limit is not exceeded. Exceeding the viscosity limit in general does not lead to limitations on the main activity of the organopolysiloxane solutions described, but can result in process technology problems. Products thus prepared are as a rule water-soluble organopolysiloxane solutions which contain fluoroalkyl groups and are present as a concentrate.

Alternatively, a co-condensate can also be obtained directly by introducing the alkoxysilane mixture into a water/acid or a water/alcohol/acid mixture, reacting the components and subsequently removing the alcohol formed by hydrolysis by distillation. Here too, water is preferably added during the removal of the alcohol by distillation, at the rate at which alcohol or alcohol/water mixture is removed from the reaction medium. Monobasic acids are particularly suitable for adjusting the pH to values ranging from 1–8. Products thus prepared have a lower silane concentration than the products described above, but in contrast thereto comprise virtually no free alcohol and also liberate essentially no further alcohols by hydrolysis on dilution with water.

The compositions of the invention in general have a flash point of significantly more than 70° C.

The process for the preparation of the organopolysiloxane-containing compositions of the invention can be carried out as described in detail below.

Preferably, in the process of the invention, water-soluble organosilanes of formula II are first mixed with organosilanes of formula III, which are not water-soluble, and, if appropriate, with those of formulae IV and/or V. More particularly, the following organosilanes are employed.

Suitable organosilanes of the formula II preferably include aminopropyltriethoxysilane, aminopropyltrimethoxysilane, aminopropylmethyidiethoxysilane, aminopropylmethyidimethoxysilane, and mixtures thereof.

Suitable fluoroalkyl-functional organosilanes of formula III preferably include those compounds which contain $CF_3(CF_2)_7-$, $CF_3(C_6H_4)-$, $C_6F_5-$ or $R^fCH_2CH_2(C=O)-$, where $R^f=C_nF_{2n+1}$ and n=2–18, as the group $R^1$. Such compounds are disclosed in unpublished German Patent Application No. 196 44 561.2, and are preferred. Tridecafluoro-1,1,2,2-tetrahydrooctyl-1-trimethoxysilane, tridecafluoro-1,1,2,2-tetrahydrooctyl-1-triethoxysilane and the corresponding mixtures are particularly preferred.

Suitable organosilanes of formula IV preferably include dimethyldimethoxysilane, dimethyldiethoxysilane, propylmethyldimethoxysilane, propylmethyldiethoxysilane and mixtures thereof.

Suitable organosilanes of formula V preferably include propyltrimethoxysilane, propyltriethoxysilane, isobutyltrimethoxysilane, isobutyltriethoxysilane, octyltrimethoxysilane, octyltriethoxysilane and mixtures thereof.

The molar ratio of the organosilanes employed in the invention satisfies the relationship $0.1 \leq [a/(b+c+d)]$, preferably $0.25 \leq [a/(b+c+d)] \leq 6000$, particularly preferably $1 \leq [a/(b+c+d)] \leq 3$.

The reaction mixture which is prepared is subjected to a co-condensation reaction, preferably with 0.5–30 mols of water per mol of organosilane, more preferably 0.5–20 mols of water per mol of water, and especially preferably 1–5 mols of water per mol of the silanes.

Thereafter, the mixture is suitably treated with acid, an alcohol/acid mixture or an alcohol/water/acid mixture. Methanol, ethanol, propanol, isopropanol, n-butanol, isobutanol, t-butanol or 2-methoxyethanol is preferably employed as the alcohol.

The pH of the reaction mixture is suitably adjusted to a value of 1–8, preferably a value of 1–6, particularly preferably to a value of 1–5.

The acid component employed is in general an inorganic or organic acid, preferably a monobasic acid, particularly preferably nitric acid, hydrochloric acid, acetic acid, formic acid or mixtures of the above-mentioned acids.

The addition of reaction components is preferably carried out in portions with temporal interruptions. However, the metering operation can also be carried out continuously with temporal interruptions, or the batchwise and continuous procedures for metering can be combined with one another in a suitable manner.

The reaction is generally carried out in a temperature range of 0°–100° C., preferably in a temperature range of 10°–80° C., and particularly preferably of 20°–60° C. The reaction is normally conducted with stirring.

The alcohol already present and/or formed during the reaction is in general removed from the reaction mixture. The alcohol already present and/or formed during the reaction is preferably removed by distillation, and at the same time water is added at the rate at which alcohol is removed from the reaction mixture. The removal of the alcohol by distillation is preferably carried out under reduced pressure and until a temperature which corresponds to the boiling point of water has been reached at the top of the column.

The compositions of the invention are essentially free from organic solvents, but can comprise small amounts of free alcohols, in particular methanol and/or ethanol. The alcohol content in the organopolysiloxane-containing composition of the invention is preferably less than 5% by weight. The residual content of alcohol in the organopolysiloxane-containing compositions is particularly preferably adjusted to values of <3% by weight, especially preferably <1% by weight.

An adjustment of the pH in the reaction medium can also be carried out by addition of an organic or inorganic acid, in particular a monobasic acid, during and/or after the removal of the alcohols by distillation.

In order to reduce foam formation, a defoamer, particularly preferably an aqueous silicone resin suspension, is preferably added before and/or during the removal of the alcohol by distillation.

Clouding or precipitates sometimes occur in the product during or after the end of the distillation, which is often based on the defoamer added. In order to obtain a clear product, the resulting product is suitably after-purified by sedimentation and/or filtration after the removal of the alcohol by distillation. The nitration and the removal of the sediment can be carried out, for example, via a pressure suction filter, a separator, a decanter or similar apparatus.

Products prepared by the process of the invention are stable and clear solutions. The organopolysiloxane-containing compositions of the invention can suitably be diluted with water in any ratio, and are essentially free from organic solvents and surfactants as emulsifiers.

The use of the compositions of the invention or prepared according to the invention has distinct advantages over the products described initially. A hydrophobizing and at the same time oleophobizing action can be achieved in an outstanding manner by using the composition according to the invention.

The present invention, therefore, also relates to the use of the organopolysiloxane-containing compositions of the invention for simultaneous hydrophobizing and oleophobizing and for dirt- and color-repellent treatment of surfaces, of plastics, of metals and of mineral building materials, for protecting buildings and facades, for coating glass fibers, for silanizing fillers and pigments, for improving the rheological properties of polymer dispersions and emulsions, for hydrophobizing and oleophobizing and for dirt- and color-repellent treatment of textiles, leather, starch products and cellulose products, such as, for example, wood, as release agents, as crosslinking agents, as adhesion promoters, in particular for fluorinated polymers, such as, for example, Teflon or coatings based on fluorinated polymers, and as additives for paints and coatings.

Having generally described this invention, a further understanding can be obtained by reference to certain specific examples which are provided herein for purposes of illustration only and are not intended to be limiting unless otherwise specified.

EXAMPLES

Reaction apparatus for all the following examples including the comparison example Laboratory stirred vessel reactor of 2 1 capacity, temperature-controllable, internal temperature measurement, liquid metering device, distillation bridge with overhead temperature measurement, product condenser, distillate receiving container, laboratory pressure suction filter (2 1 capacity).

The following process parameters apply to all the following examples, including the comparison example Foaming problems during the distillation can be prevented by adding a few drops of a commercially available defoamer based on aqueous silicone resin emulsions to the reaction solution. The slight clouding resulting from the addition of defoamer can be removed by filtration via a pressure suction filter with a glass fiber filter (pore width <1 $\mu$m).

The products obtained in Examples 1 and 2 of the invention have the following properties in common The product is clear and is miscible with water in any ratio. The content of alcohols is $\leq 0.5\%$ by weight. The flash point of the products is at values >95° C. and also does not fall on further dilution with water, since no further hydrolysis takes place and, therefore, no further alcohols are liberated.

Legend to the abbreviations
DYNASYLAN® 1203, AMEO=3-aminopropyltriethoxysilane
VPS 8161=tridecafluoro-1,1,2,2-tetrahydrooctyl-1-trimethoxysilane
VPS 8261=tridecafluoro-1,1,2~2-tetrahydrooctyl-1-triethoxysilane
PTMO=n-propyltrimethoxysilane
PMDMO=n-propylmethyldimethoxysilane

EXAMPLE 1

Preparation of a water-soluble cohydrolysate from DYNASYLAN™ 1203 and VPS 8161 (tridecafluoro-1,1,2.2-tetrahydrooctyl-1-trimethoxysilane) in a molar ratio of 3:1

A 14.2 g amount of DYNASYLAN™ 1203 and 10.0 g of VPS 8161 are initially introduced into the apparatus described above. 3.1 g of water are added. During this operation, the temperature rises from 20°–30° C. The reaction mixture is stirred at 50° C. for 3 hours. A mixture of 220.0 g of water and 4.2 g of formic acid (84% by weight in water) is then metered in over the course of 5 minutes. An ethanol/methanol/water mixture is removed by distillation over the course of about 2 hours (pressure: 150–133 mbar; temperature: 30°–48° C.). When the overhead temperature is about 50° C. and the top product comprises only water, the distillation is ended and the product is diluted with water to 1000 g.

EXAMPLE 2

Preparation of a water-soluble cohydrolysate of DYNASYLAN ~1203. PMDMO. PTMO and VPS 8161 in a molar ratio of 2:1:1:0.02

A 110.5 g amount of DYNASYLAN™1203, 41.0 g of PTMO, 30.0 g of PMDMO and 2.6 g of VPS 8161 are initially introduced into the apparatus described above with a 1 liter stirred reactor. A 36.2 g amount of water is added via the metering device over the course of 5 minutes. During this operation, the temperature rises from 20°–40° C. The reaction mixture is stirred at 60° C. for 2 hours. 54.5 g of the hydrolysis alcohol formed are then distilled off (pressure: 250 mbar; temperature: 42° C.). A 117 g amount of water and 32.5 g of formic acid (85% by weight in water) are mixed and are added over the course of about 20 minutes. During this operation, the temperature rises from 44° C.–48° C. An ethanol/methanol/water mixture is removed by distillation over the course of about 4 hours, and is simultaneously replaced by water, so that the concentration of the solution remains constant (pressure: 200–133 mbar; temperature: 44°–50° C.). When the overhead temperature is about 50° C. and the top product comprises only water, the distillation is ended and the product is diluted with water to 955 g.

EXAMPLE 3

Preparation of a water-soluble cohydrolysate from DYNASYLAN™ 1203 and VPS 8161 in a molar ratio of 1:1

A 44.2 g amount of DYNASYLAN™ 1203 and 93.4 g of VPS 8161 are initially introduced into the apparatus described above with a 250 ml stirred reactor. 14.4 g of water are added via the metering device. During this operation, the temperature rises from 20° C.–30° C. The reaction mixture is stirred at 55°–60° C. for 3 hours. The reaction mixture is then cooled to about 30° C. and 11.9 g of formic acid (85% by weight in water) are added over the course of about 10 minutes. During this operation, the temperature rises to about 40°–50° C. This concentrate is miscible with water in any ratio.

EXAMPLE 4

Preparation of a water-soluble cohydrolysate of DYNASYLAN™ 1203 and 20VPS 8281 in a molar ratio of 1:1

A 44.2 g amount of DYNASYLAN™ 1203 and 102 g of VPS 8261 are initially introduced into the apparatus described above with a 250 ml stirred reactor. 14.4 g of water are added via the metering device. During this operation the temperature rises from 20° C.–30° C. The reaction mixture is stirred at 55°–60° C. for 3 hours. The reaction mixture is then cooled to about 30° C. 11.9 g of formic acid (85% by weight in water) are added over the course of about 10 minutes. During this operation, the temperature rises to about 40°–50° C. This concentrate is miscible with water in any ratio. The product is viscous. The viscosity can be lowered significantly by addition of alcohols (methanol, ethanol).

EXAMPLE 5

Treatment of mineral surfaces with the product from Example 1

Brick stone, lime sandstone and concrete stone were cut into ashlars having an edge length of about 5 cm and immersed in the aqueous formulation of the invention from Example 1 for about 5 minutes. After the stones have been dried at room temperature or in a drying cabinet at about 120° C., water and also oil (mineral oil, heating oil-Marlotherm S=tritoluene- or else silicone oil) applied to the surface of the stones no longer penetrate into the surface of the building materials. The beading effect of the liquids mentioned is very good. On untreated specimens, the liquids mentioned penetrate immediately into the surface. The product is, therefore, suitable for simultaneous hydro- and oleophobization of mineral building materials.

EXAMPLE 5a

Treatment of mineral surfaces with the product from Example 1

Brick stone, lime sandstone and concrete stone were cut into ashlars having an edge length of about 5 cm and immersed in the aqueous formulation of the invention from Example 1 (the aqueous formulation is diluted with water in a manner such that a 0.01% by weight solution, based on the fluoroalkylalkoxysilane employed, is prepared) for about 5 minutes. After the stones have dried at room temperature or in a drying cabinet at about 120° C., water and also oil (mineral oil, heating oil -marlotherm S=tritoluene- or also silicone oil) applied to the surface of the stones no longer penetrate into the surface of the building materials. The beading effect of the liquids mentioned is very good. On untreated specimens, the liquids mentioned penetrate immediately into the surface. The product is, therefore, suitable for simultaneous hydro- and oleophobization of mineral building materials.

EXAMPLE 5b

Treatment of mineral surfaces with the product from Example 1:

Brick stone, lime sandstone and concrete stone were cut into ashlars having an edge length of about 5 cm and immersed in the aqueous formulation of the invention from Example 1 (the aqueous formulation is diluted with water in a manner such that a 0.005% by weight solution, based on the fluoroalkylalkoxysilane employed, is prepared) for about 5 minutes. After the stones have been dried at room temperature or in a drying cabinet at about 120° C., water and also oil (mineral oil, heating oil -Marlotherm S=tritoluene- or else silicone oil) applied to the surface of the stones penetrate into the surface of the building materials after a few minutes. Although a beading effect of the liquids mentioned is still present, it is of only short duration. On untreated specimens, the liquids mentioned penetrate immediately into the surface. The product is, therefore, of limited suitability for simultaneous hydro- and oleophobization of mineral building materials.

EXAMPLE 5c

Treatment of mineral surfaces with the product from Example 1

Brick stone, lime sandstone and concrete stone were cut into ashlars having an edge length of about 5 cm and immersed in the aqueous formulation of the invention from Example 1 (The aqueous formulation is diluted with water in a manner such that a 0.001% by weight solution, based on the fluoroalkylalkoxysilane employed, is prepared.) for about 5 minutes. After the stones have been dried at room temperature or in a drying cabinet at about 120° C., water and also oil (mineral oil, heating oil -Mariotherm S=tritoluene- or else silicone oil) applied to the surface of the stones penetrate into the surface of the building materials. A beading effect of the liquids mentioned is no longer observed. On untreated specimens, the liquids mentioned likewise penetrate immediately into the surface. The product is, therefore, unsuitable for simultaneous hydro- and oleophobization of mineral building materials.

EXAMPLE 6

Treatment of cotton with the product from Example 1

Cotton was cut into squares having an edge length of about 5 cm and immersed in the aqueous formulation of Example 1 for about 5 minutes. After the pieces of fabric have been dried at room temperature or in a drying cabinet at about 120° C., water and also oil (mineral oil, heating oil -Marlotherm S-tritoluene- or else silicone oil) applied to the surface of the pieces of fabric no longer penetrate into the surface of the pieces of fabric. The beading effect of the liquids mentioned is very good. On untreated specimens, the liquids mentioned penetrate immediately into the surface. The product is, therefore, suitable for simultaneous hydro- and oleophobization of cotton.

EXAMPLE 7

Treatment of wood with the product from Example 1

A wooden board about 0.5 cm thick was cut into rectangles having an edge length of about 3×5 cm and immersed in the aqueous formulation of Example 1 for about 5 minutes. After the pieces of wood have been dried at room temperature or in a drying cabinet at about 120° C., water and also oil (mineral oil, heating oil -Marlotherm S=tritoluene- or else silicone oil) applied to the surface of the pieces of wood no longer penetrate into the surface of the pieces of wood. The beading effect of the liquids mentioned is very good. On untreated specimens, the liquids mentioned penetrate immediately into the surface. The product is, therefore, suitable for simultaneous hydro- and oleophobization of wood.

EXAMPLE 8

Treatment of paper with the product from Example 1

Paper handkerchiefs were cut into pieces having an edge length of about 5 cm and immersed in the aqueous formulation of Example 1 for about 5 minutes. After the pieces of paper have been dried at room temperature or in a drying cabinet at about 120° C., water and also oil (mineral oil, heating oil -Marlotherm S=tritoluene- or else silicone oil) applied to the surface of the pieces of paper no longer penetrate into the surface of the pieces of paper. The beading effect of the liquids mentioned is very good. On untreated specimens, the liquids mentioned penetrate immediately into the surface. The product is, therefore, suitable for simultaneous hydro- and oleophobization of paper.

EXAMPLE 9

Treatment of glass with the product from Example 1

Panes of glass having an edge length of about 10×20 cm were immersed in the aqueous formulation of Example 1 for about 5 minutes. After the panes of glass have been drained off and dried at room temperature or in a drying cabinet at about 120° C., water and also oil (mineral oil, heating oil -Marlotherm S=tritoluene- or else silicone oil) applied to the surface of the panes of glass bead significantly. The contact angle for the liquids mentioned is >90°. On untreated specimens, the contact angle is significantly less than 90°. The product leaves behind a film on the pane of glass and is suitable for simultaneous hydro- and oleophobization of glass.

EXAMPLE 10

Treatment of metal surfaces with the product from Example 1

About 1 mm thick, sand-blasted steel sheets and Al foil having an edge length of about 10×20 cm were immersed in the queous formulation of Example 1 for about 5 minutes. After the pieces of steel have been drained off and dried at room temperature or in a drying cabinet at about 120° C., water and also oil (mineral oil, heating oil -Marlotherm S=tritoluene- or else silicone oil) applied to the surface of the pieces of steel bead significantly. The product produces a film on the metal surface. The contact angles, evaluated visually, are significantly higher on the treated metal specimens than on the untreated specimens. The product is, therefore, suitable for simultaneous hydro- and oleophobization of metal surfaces. Storage of coated and non-coated steel sheets in aqueous HCl solution shows a significantly lower corrosion on the steel sheets coated with the aqueous formulation of Example 1.

EXAMPLE 11

Treatment of leather with the product from Example 1

Absorbent leather (chamois leather) was immersed in the aqueous formulation of Example 1 for about 5 minutes.

After the pieces of leather have been dried at room temperature or in a drying cabinet at about 120° C., water and also oil (mineral oil, heating oil -Marlotherm S=tritoluene- or else silicone oil) applied to the surface of the pieces of leather no longer penetrate into the surface of the pieces of leather. The beading effect of the liquids mentioned is very good. On untreated specimens, the liquids mentioned penetrate immediately into the surface. The product is, therefore, suitable for simultaneous hydro- and oleophobization of leather.

EXAMPLE 12

Treatment of surfaces of plastic with the product from Example 1

Sheets of MMA plastic about 1 mm thick were immersed in the aqueous formulation of Example 1 for about 5 minutes. After the sheets of plastic have been drained off and dried at room temperature or in a drying cabinet at about 90° C., water and also oil (mineral oil, heating oil -Marlotherm S=tritoluene- or else silicone oil) applied to the surface of the pieces of plastic bead significantly. The beading effect of the liquids mentioned is very good. On untreated specimens, the contact angle is significantly less (visual evaluation). The product is, therefore, suitable for simultaneous hydro- and oleophobization of surfaces of plastic.

The disclosure of German priority Application No. 196 49 953.4 filed Dec. 3, 1996 is hereby incorporated by reference.

Obviously numerous modifications and variations of the present invention are possible in light of the above teachings. It is, therefore, to be understood that within the scope of the appended claims, the invention may be practiced otherwise than as specifically described herein.

What is claimed as new and is desired to be secured by:

1. An aqueous organopolysiloxane-containing composition, which comprises organopolysiloxanes of formula I:

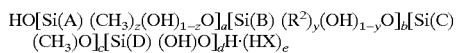

wherein A is an aminoalkyl group of formula II:

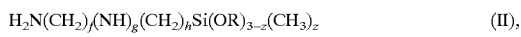

in which $0 \leq f \leq 6$, $g=0$ if $f=0$ and $g=1$ if $f>0$, $0 \leq h \leq 6$ and $0 \leq z \leq 1$;

B is a fluoroalkyl group of formula III:

wherein $R^1$ is a mono-, oligo- or perfluorinated alkyl group having 1–9 C atoms, or a mono-, oligo- or perfluorinated aryl group, Y is a $CH_2$, O or S group, $R^2$ is a linear, branched or cyclic alkyl group having 1–8 C atoms or an aryl group and $0 \leq y \leq 1$ C is an alkyl group of formula IV:

and D is an alkyl group of formula V:

wherein $R^3$, in each case is identical or different, and is a linear, branched or cyclic alkyl group having 1–8 C atoms, and R, in each case is identical or different, and is a linear, branched or cyclic alkyl group having 1–8 C atoms or an aryl group;

and HX is an acid, in which X is an inorganic or organic acid radical, and $0 \leq y \leq 1$, $0 \leq z \leq 1$, $a>0$, $b>0$, $c \geq 0$, $d \geq 0$, $e \leq 0$ and $(a+b+c+d) \geq 2$, the composition being essentially free from organic solvents, having a flash point of more than 70° C. and liberating essentially no alcohols by hydrolysis on dilution with water.

2. The composition as claimed in claim 1, which has a pH of 1–8.

3. The composition as claimed in claim 1, which comprises a monobasic inorganic and/or organic acid and/or secondary products thereof.

4. The composition as claimed in claim 1, wherein the alcohol content in the organopolysiloxane-containing composition is less than 5% by weight.

5. The composition as claimed in claim 1, wherein the content of organopolysiloxanes as the active compound in the composition is 0.005–60% by weight.

6. The composition as claimed in claim 1, which comprises a silicone resin suspension.

7. The composition as claimed in claim 1, wherein a hydrophobizing and oleophobizing action is achieved on use of the composition.

8. An organopolysiloxane-containing composition as claimed in claim 1, prepared by:

mixing water-soluble organosilanes of formula II:

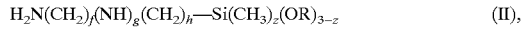

in which $0 \leq f \leq 6$, $g=0$ if $f=0$ and $g=1$ if $f>1$, $0 \leq h \leq 6$, $0 \leq z \leq 1$ and R is a linear, branched or cyclic alkyl group having 1–8 C atoms or an aryl group, with fluoroalkylfunctional organosilanes of formula III:

wherein $R^1$ is a mono-, oligo- or perfluorinated alkyl group having 1–9 C atoms or a mono-, oligo- or perfluorinated aryl group, Y is a $CH_2$, O or S group, $R^2$ is a linear, branched or cyclic alkyl group having 1–8 C atoms or an aryl group and R is a linear, branched or cyclic alkyl group having 1-organosilanes of formula IV:

and/or organosilanes of formula V:

in which $R^3$ here and in the preceding formula is a linear, branched or cyclic alkyl group having 1–8 C atoms, $R^3$ here and in the preceding formula is in each case identical or different, R here and in the preceding formula is a linear, branched or cyclic alkyl group having 1–8 C atoms or an aryl group and R is in each case identical or different, in a molar ratio of $M=[a/(b+c+d)] \geq 0.1$, where $a>0$, $b>0$, $c \geq 0$, $d \geq 0$, wherein a, b, c and d are the sums of the numbers of mols of the organosilanes of formulas II, III, IV and V, respectively;

adding water or a water/acid mixture and/or a water/acid/alcohol mixture to the mixture;

adjusting the pH of the reaction mixture to a value of 1–8; and removing the alcohol already present and/or formed during the reaction.

* * * * *